Patented May 3, 1932

1,856,212

UNITED STATES PATENT OFFICE

SEBASTIAN GASSNER AND FRITZ BAUMANN, OF LEVERKUSEN-ON-THE-RHINE, GERMANY, ASSIGNORS TO GENERAL ANILINE WORKS, INC., OF NEW YORK, N. Y., A CORPORATION OF DELAWARE

PROCESS OF PREPARING 1.4-DIAMINOANTHRAQUINONE

No Drawing. Application filed March 13, 1931, Serial No. 522,515, and in Germany February 8, 1927.

The present invention relates to a process of preparing 1.4-diaminoanthraquinone from leuco-1.4-diaminoanthraquinone.

It is known that leuco-1.4-diaminoanthraquinone can be converted into 1.4-diaminoanthraquinone by heating it in nitrobenzene-solution.

We have found that this process is extraordinarily accelerated and particularly pure 1.4-diaminoanthraquinone is obtained, by adding to the reaction mixture a small quantity of piperidine. The reaction is advantageously performed while applying the piperidine in an amount of between about 0,4–2,0% by weight (calculated on the leuco-1.4-diaminoanthraquinone present) and while heating the reaction mixture to a temperature between about 130–170° C.

The new process has the advantage over the processes known before our invention that it proceeds very quickly and smoothly and substantially without the formation of any by-products.

The following example illustrates our invention without limiting it thereto; the parts being by weight:—

*Example.*—In an enamelled vessel provided with a stirrer 100 parts of leuco-1.4-diaminoanthraquinone are heated with 400 parts of nitrobenzene and 1 part of piperidine to 140–150° C. Heating at this temperature is continued until no water is split off any more and until a test portion poured into strong sulfuric acid does not shown any fluorescence when brought under a quartz mercury vapour lamp. The working up of the reaction mixture may be performed by filtering the 1.4-diaminoanthraquinone from the nitrobenzene solution after cooling, or by distilling off the nitrobenzene and the piperidine in vacuo.

This is a continuation in part of our copending application Serial No. 223,838, filed October 3, 1927.

We claim:—

1. Process which comprises heating leuco-1.4-diaminoanthraquinone in nitrobenzene-solution in the presence of a small amount of piperidine.

2. Process which comprises heating leuco-1.4-diaminoanthraquinone to a temperature of between about about 130–170° C. in nitrobenzene-solution and in the presence of between about 0,4–2,0% by weight of piperidine (calculated on the leuco-1.4-diaminoanthraquinone applied).

3. Process which comprises heating 100 parts by weight of leuco-1.4-diaminoanthraquinone with 400 parts by weight of nitrobenzene and 1 part by weight of piperidine to 140–150° C. until a test portion poured into strong sulfuric acid does not show any fluorescence when brought under a quartz mercury vapour lamp.

SEBASTIAN GASSNER.
FRITZ BAUMANN.